Nov. 20, 1962  F. THIELE  3,064,590
APPARATUS FOR MAKING CONTINUOUS STRIPS
OF PASTRY, SUCH AS WAFERS
Filed Oct. 19, 1959  3 Sheets-Sheet 1
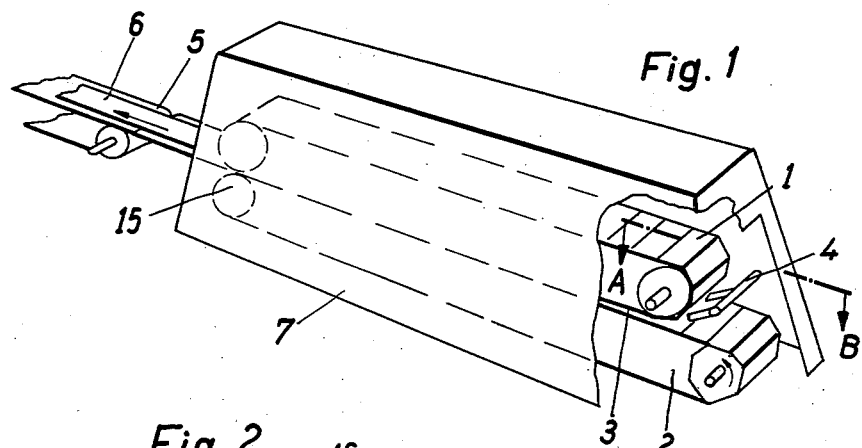
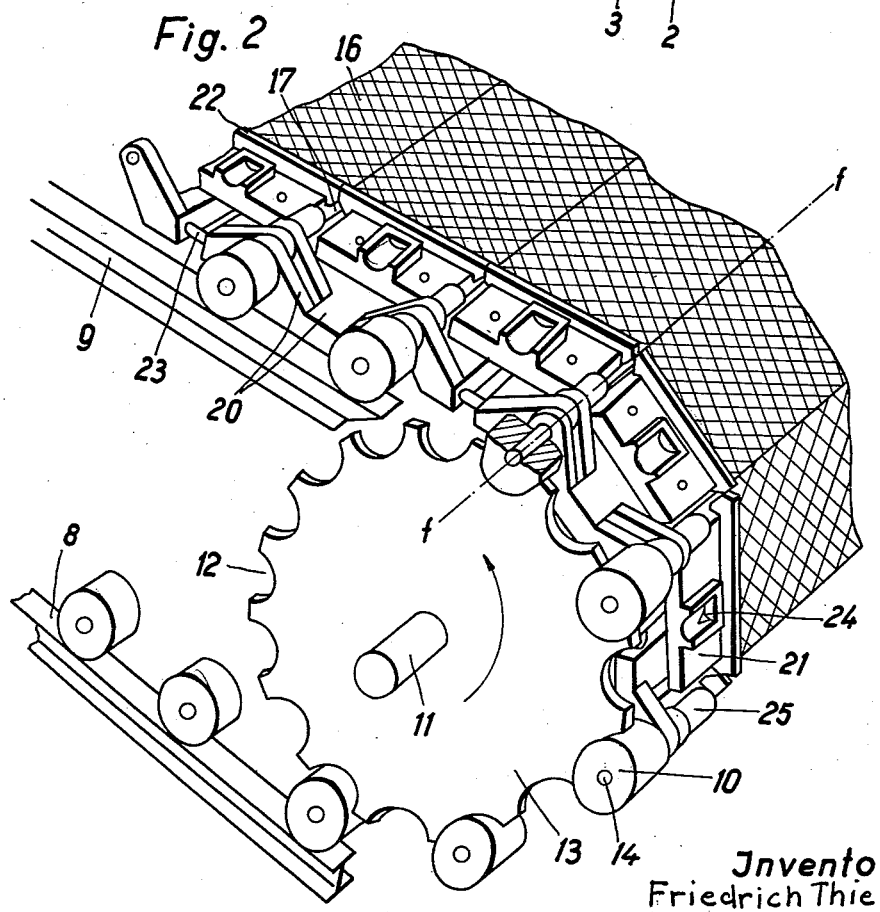
Inventor:
Friedrich Thiele
by
Bierman + Bierman
Attorneys

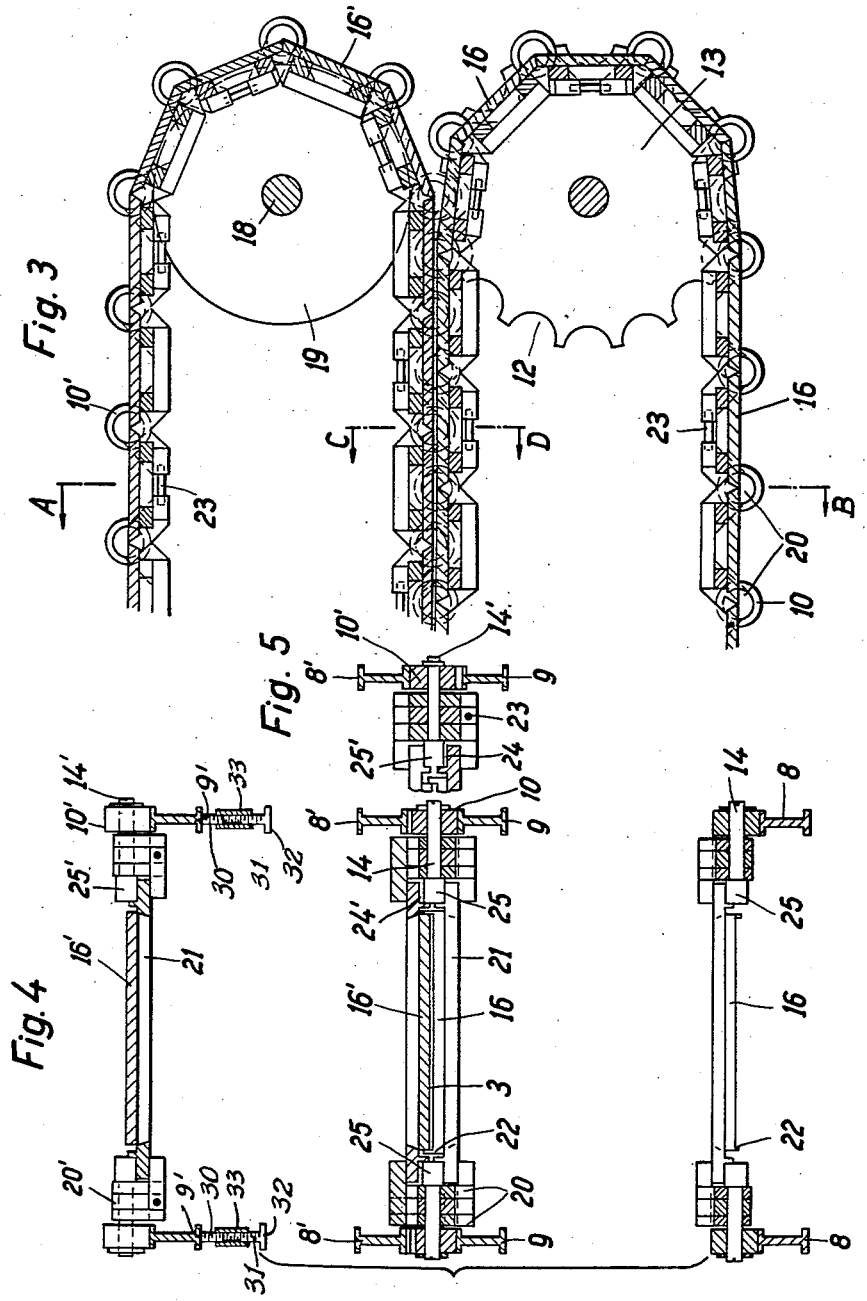

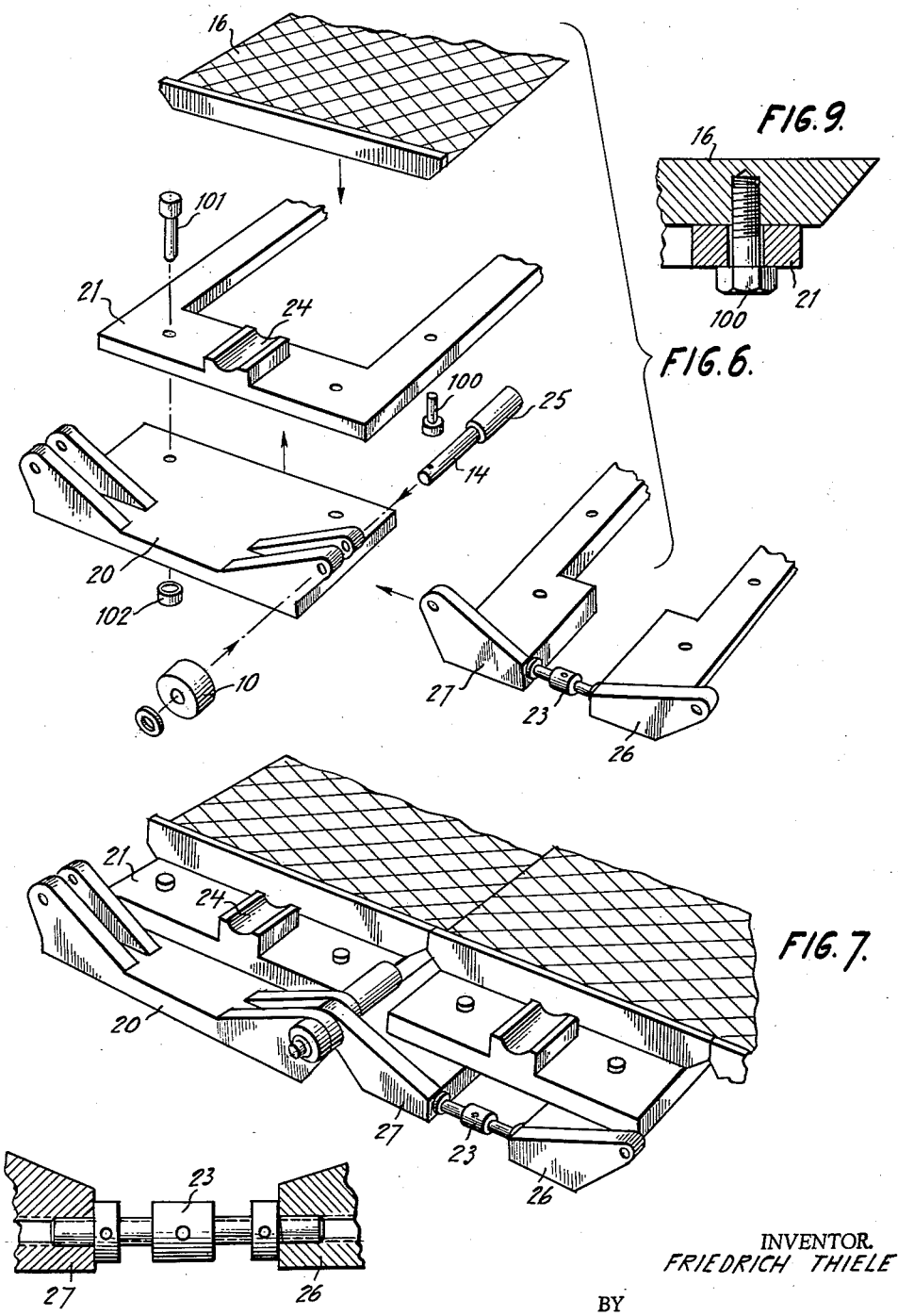

United States Patent Office 3,064,590
Patented Nov. 20, 1962

3,064,590
APPARATUS FOR MAKING CONTINUOUS STRIPS
OF PASTRY, SUCH AS WAFERS
Friedrich Thiele, Hannover, Germany, assignor to Werner
Bahlsen, Hannover, Germany
Filed Oct. 19, 1959, Ser. No. 847,315
8 Claims. (Cl. 107—57)

This invention relates to apparatus for making continuous strips of pastry, such as wafers, waffles, biscuits and the like and is more particularly concerned with apparatus of the type including endless bands or conveyors which are heated and which constitute baking surfaces, dough or the like for baking to form the pastry being fed between parallel adjacent straight runs of such bands to be formed into a thin continuous strip.

It is known to make the endless bands of such apparatus from a plurality of flat plate-like members which are hinged or linked together, the arrangement being such that the joints between the plate-like members of the one endless band are displaced or offset relative to the joints in the other band, so that these joints do not coincide. It is with such aparatus (hereinafter called "apparatus as hereinbefore specified" that the present invention is concerned.

In prior known arrangements other than in the apparatus as hereinbefore specified, the bands are mounted on driving or guiding wheels, rollers or the like and comprise plates which, when they run over the driving or guide wheels, tend to separate from each other so that gaps occur at the joints. Since, generally the dough is fed to the bands near to the wheels, it is able to pass through the gaps between the plates constituting a considerable wastage of dough, and necessitating frequent cleaning and maintenance of the appapratus.

It is the object of the present invention to provide a construction wherein this disadvantage is overcome.

According to the present invention apparatus as hereinbefore specified for making continuous strips of pastry is characterized in that the plate-like members are hinged together by spindles, the axes of which are in line with the transverse edges of the said members and lie in the plane of the baking surface, i.e. the surface thereof which, in use, contacts the dough, and wherein recesses are provided in each band between adjacent hinge spindles so that the hinge spindles of one band can locate between those of the other band along the adjacent parallel runs of the bands, the bands in said runs thereby being located at a distance apart equal to the desired depth of the baking space.

With such an arrangement, the adjacent plate-like members of each band abut one another continuously and do not separate when they deviate from their straight runs.

In one preferred form of the invention the hinge spindles serve, in addition, as axles for rollers which run on guide rails or the like and define the paths of movement of the bands.

The arrangement may be such that the hinges project at each edge of the bands, there being on each band recesses into which parts of the spindles of the other band can engage. Such an arrangement will serve as a coupling for the two bands, making it necessary to drive only one of them, and at the same time ensuring accurate register between the plates of the respective bands and reducing the wear on the moving parts.

If it is desired to provide apparatus which is capable of producing various thicknesses of pastry, this can be effected by making the guide rails adjustable.

The invention will be described further, by way of example, with reference to the accompanying drawings in which:

FIG. 1 is a diagrammatic perspective view of a preferred embodiment of apparatus for making continuous strips of pastry in accordance with the invention;

FIG. 2 is a fragmentary enlarged perspective view of part of the lower band of the apparatus shown in FIG. 1;

FIG. 3 is a cross-sectional elevation corresponding to the line A—B of FIG. 1, this view being on an enlarged scale as compared with FIG. 1, but on a slightly smaller scale than FIG. 2;

FIG. 4 is a cross-sectional end elevation corresponding to the line A—B of FIG. 3, being on the same scale as the latter view;

FIG. 5 is a fragmentary sectional end elevation corresponding to the line C—D of FIG. 3;

FIG. 6 is an exploded perspective view of a portion of the apparatus;

FIG. 7 is a perspective view showing the elements of FIG. 6 assembled; and

FIGS. 8 and 9 are fragmentary sectional detail views.

Referring now to FIG. 1, it is to be understood that this view is purely of a diagrammatic nature, the purpose of which is to illustrate the general principles of the apparatus according to the invention, and the details thereof do not necessarily agree accurately with the remaining FIGURES 2 to 9.

The apparatus according to the invention comprises an upper endless band 1 and a lower endless band 2 between the adjacent runs of which is baking space 3 into which dough is fed for example, by nozzles 4. The bands are supported by guide wheels, one of which is designated 15 in FIG. 1 and in use are driven in the direction indicated by the arrow. The bands are enclosed in a suitable casing 7, and they are heated in any convenient manner.

Dough which is fed to the baking space 3 is cooked as it is carried along inside the casing, by the bands, and is discharged as a continuous baked strip at 6 onto a delivery conveyor 5.

The precise details of the endless bands 1 and 2 and guide means therefor are illustrated in FIGS. 2 to 9.

The lower band 2 is composed of a plurality of plate-like members 16 the baking surface (i.e. the surface which contacts the dough) of which is suitably embossed to provide a pattern on the finished pastry. The width of the baking surface of each band is defined by projecting guide strips 22 (see FIG. 2) which are provided only on the lower band 2 at each side of each plate-like member 16, and are secured to holding frames 21 on which the plate-like members 16 are mounted. Each holding frame has a recess 24 thereon midway along its length (as compared with the direction of travel of the band) and the purpose of this will be described later.

Beneath each holding frame is attached a hinge plate, alternate plates 20 terminating at both ends in a pair of hinge lugs and the remaining hinge plates terminating at both ends in a single hinge lug, the single lug of one plate engaging between the pair of lugs of the next adjacent plate and pivotally secured together by a spindle 14 passing therethrough. The spindles 14 constitute the hinge spindles of the plates, and the arrangement thereof is such that the axes of the spindles are in line with the transverse edges of the associated plate-like members 16 which are in the plane of the baking surface thereof, as indicated at f—f in FIG. 2. As will be evident from FIG. 7, the remaining hinge plates are made in two parts 26 and 27 which are adjustably connected together by screws or studs 23, having right and left hand threads which are threaded into the bores in parts 26 and 27, respectively. This arrangement permits adjustment of the distances between each of the plate-like members 16, so as to ensure that their adjacent edges are in light abutting relationship there being no gaps between the plates.

The spindles 14 extend to each side of the hinge lugs, and at the ends thereof remote from the band are secured rollers 10. The ends of the spindles 14 adjacent the bands are provided with reinforced or thickened extensions 25. Screw 100 holds members 16 and 21 together. Bolts 101 cooperate with nuts 102 to hold members 20 and 21 together.

Mounted horizontally upon a frame (not shown in FIG. 1) within the casing 7, are guide rails 8 and 9, these providing bearing surfaces upon which the rollers 10 can run and defining the path of the endless band. The upper guide rail 9 is adjustable, vertically. This may be accomplished by providing a device similar to that employed for adjusting guide rail 9' (FIG. 4) and comprising a threaded depending member 30 on upper guide rails 9' and an upstanding member 31 on frame member 32 threaded oppositely, and a left and right threaded sleeve 33 connecting 30 and 31. Rails 8 are adjusted by a device (not shown) similar to that used for adjustment of rails 9'. At each end of the guide rails are provided pairs of wheels over which the band 2 runs, the wheel 15 of one pair having already been referred to. One of the wheels of the other pair which is mounted on shaft 11, is shown at 13 in FIGS. 2 and 3 and these are provided with a plurality of peripheral notches 12 into which the rollers 10 engage as the band travels therearound. As is illustrated, the number and spacing of the notches 12 is such that only each alternate notch is occupied by a roller 10 of the band 2. This is to permit passage of the rollers of the upper band 1 (yet to be described in detail) adjacent the wheels 13 when the bands are running.

The upper band 1 is very similar to the band 2 already described, and similar parts thereon have been designated with similar reference numerals, with the addition of an index, such as 9', 10' and so forth. The differences which exist between the band 1 and its parts and the band 2 lie in that fact that neither of the guide rails 8' of the upper band is necessarily capable of adjustment; and in that the upper band travels around plain wheels 19 mounted upon shafts 18 at each end of its run. Guide rails 9' are mounted for adjustment as shown at 30—31 of FIG. 4.

As has already been explained, the two bands are arranged with a very narrow baking space 3 disposed between the adjacent runs thereof, and with such arrangement the spindle extensions 25 on the lower band 2 project towards and engage into the recesses 24' in the upper band 1. Conversely the spindle extensions 25' of the upper band engage into the recesses 24 of the lower band 2. This arrangement ensures interlocking of the two bands along their runs defining the baking space 3 and drive imparted to the lower band 2 by the wheels 13 is transmitted to the upper band 1. Additionally, the arrangement ensures accurate register between the two bands, the joints between adjacent plate-like members 16 on the lower band being midway between those on the upper band.

When the bands run around the wheels 13, 15 or 19 the plates 16 or 16' pivot relative to one another about their axes which, as previously explained, lie along the transverse edges of the plates and in the planes of the baking surfaces thereof, the edges of the plates being chamfered to permit such pivotal movement. Because of the disposition of these axes, the edges of the plates have no relative movement and consequently remain continuously in light abutting relationship with one another, so that no gaps occur in the band, and consequently no passage of dough to within the bands occurs.

The invention is not limited to the precise details of the foregoing examples, and variations may be made thereto as desired. For instance, the ends of the upper and lower bands may be disposed one above the other as illustrated in FIG. 3, or alternatively, one end of the upper band may be displaced relative to the end of the lower band so as to facilitate introduction of dough thereto, as is diagrammatically shown in FIG. 1.

I claim:

1. Apparatus for making continuous strips of pastry including at least two endless conveyor bands each formed by a plurality of plate-like members, spindles passing through lugs on adjacent plate-like members for hinging said plate-like members one to the other, the axes of said spindles being disposed to lie in line with the transverse edges of said plate-like members and thus in the plane of the baking surface, that is the surface thereof, which in use, contacts the dough, said conveyor bands being superposed so the lower face of the upper band and the upper face of the lower band are in proximity to each other with the corresponding bake faces in register, sprockets having notches therein, rollers on said spindles of one band adapted to fit into alternate notches, and rollers on the spindles of the other band adapted to fit into the remaining notches of said sprockets, recesses in each plate-like member between adjacent hinge spindles so that the hinge spindles for one of said bands can locate between hinge spindles of the other band along adjacent parallel runs thereof, the bands when in said adjacent parallel runs being spaced apart by a distance equal to the desired depth of the baking space.

2. Apparatus for making continuous strips of pastry including at least two endless conveyor bands each formed by a plurality of plate-like members, spindles passing through lugs on adjacent plate-like members for hinging said plate-like members one to the other, rollers on said spindles, guide rails along which said rollers travel, for defining the path of movement along which said endless bands travel, the axes of said spindles being disposed to lie in line with the transverse edges of said plate-like members and thus in the plane of the baking surface, that is the surface thereof which, in use, contacts the dough, said conveyor bands being superposed so the lower face of the upper band and the upper face of the lower band are in proximity to each other with the corresponding bake faces in register, sprockets having notches therein, rollers on said spindles of one band adapted to fit into alternate notches, and rollers on the spindles of the other band adapted to fit into the remaining notches of said sprockets, recesses in each plate-like member between adjacent hinge spindles so that the hinge spindles for one of said bands can locate between hinge spindles of the other band along adjacent parallel runs thereof, the bands when in said adjacent parallel runs being spaced apart by a distance equal to the desired depth of the baking space.

3. Apparatus for making continuous strips of pastry including at least two endless conveyor bands each formed by a plurality of plate-like members, spindles projecting at each side of said bands passing through lugs on adjacent plate-like members for hinging said plate-like members one to the other, rollers on said spindles, guide rails, along which said rollers travel, for defining the path of movement along which said endless bands travel, the axes of said spindles being disposed to lie in line with the transverse edges of said plate-like members and thus in the plane of the baking surface, that is the surface thereof which, in use, contacts the dough, said conveyor bands being superposed so the lower face of the upper band and the upper face of the lower band are in proximity to each other with the corresponding bake faces in register, sprockets having notches therein, rollers on said spindles of one band adapted to fit into alternate notches, and rollers on the spindles of the other band adapted to fit into the remaining notches of said sprockets, recesses in each of said plate-like members between adjacent hinge spindles so that the hinge spindles for one of said bands can locate between hinge spindles of the other band along adjacent parallel runs thereof, the bands when in said adjacent parallel runs being spaced apart by a distance equal to the desired depth of the baking space.

4. Apparatus as set forth in claim 3 in which said guide rails are adjustable to permit the depth of the baking space to be varied for variation in thickness of the pastry strip.

5. Apparatus as set forth in claim 1 characterized in that each plate-like member has a lateral extension and a hinge plate having apertures at the ends thereof fitting onto adjacent spindles.

6. Apparatus as set forth in claim 1 characterized in that each plate-like member has a lateral extension and a hinge plate having apertures at the ends thereof fitting onto adjacent spindles, said hinge plate being split and means for adjusting the parts thereof.

7. Apparatus as set forth in claim 1 characterized in that said spindles have thickened portions adapted to engage in said recesses.

8. Apparatus as set forth in claim 1 characterized in that said rollers are on the free ends of said spindles.

References Cited in the file of this patent

UNITED STATES PATENTS

| | | |
|---|---|---|
| 797,604 | Perky | Aug. 22, 1905 |
| 2,045,957 | Loose | June 30, 1936 |
| 2,530,786 | Rose | Nov. 21, 1950 |
| 2,678,614 | Bahlsen | May 18, 1954 |
| 2,812,729 | Bahlsen | Nov. 12, 1957 |